H. C. MARMON.
AXLE FOR MOTOR VEHICLES.
APPLICATION FILED MAR. 12, 1909.

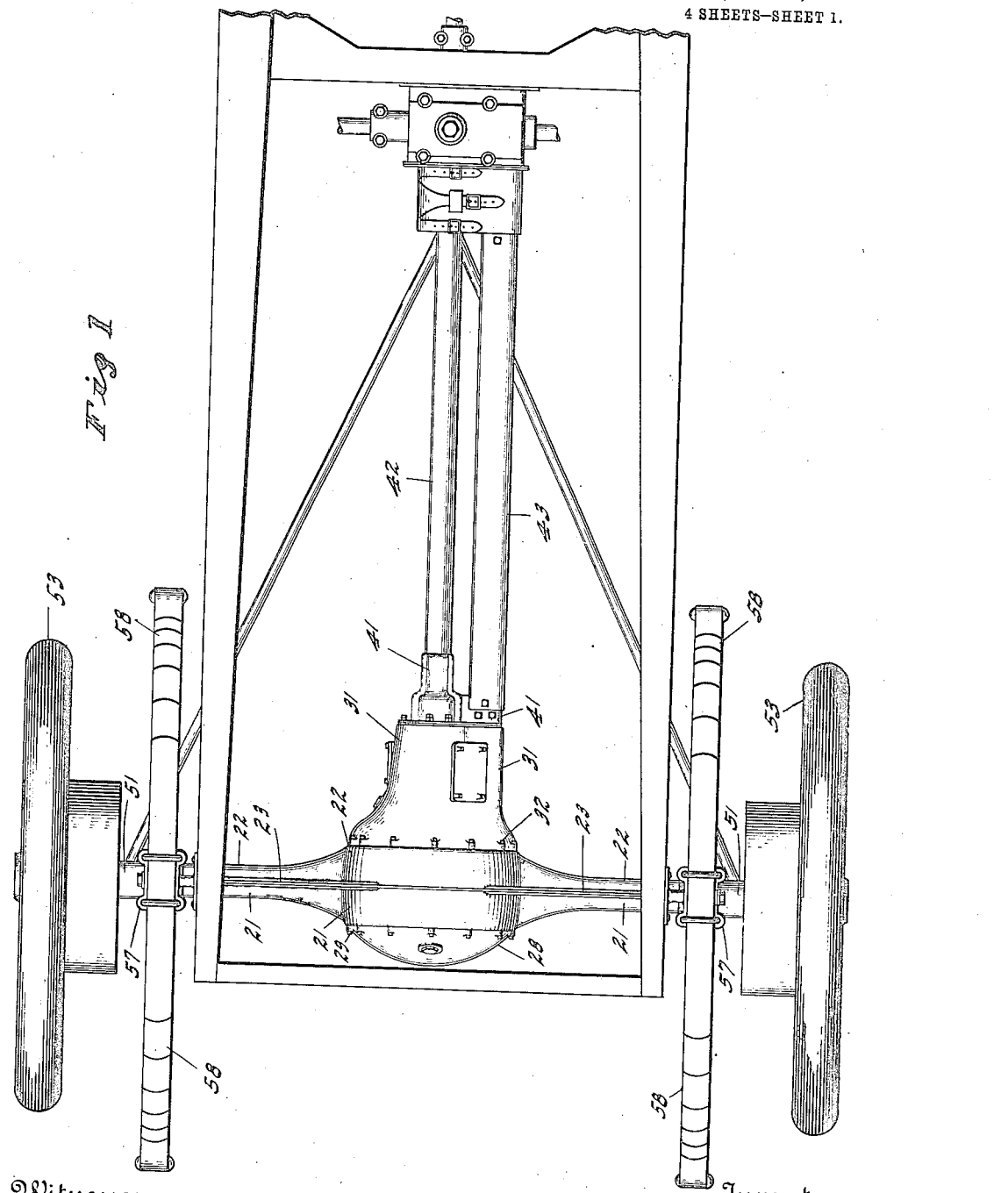

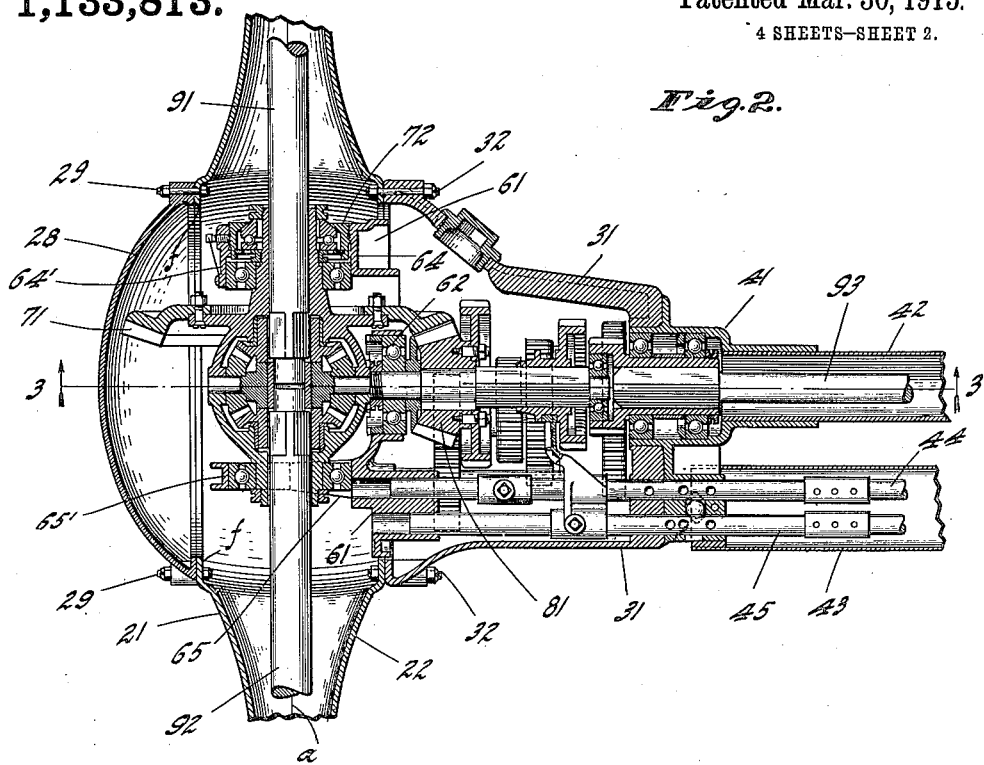

1,133,813.

Patented Mar. 30, 1915.
4 SHEETS—SHEET 3.

Witnesses
Frank A. Fahl
Thomas W. McMeans

Inventor
Howard C. Marmon,
By Bradford & Hood,
Attorneys

H. C. MARMON.
AXLE FOR MOTOR VEHICLES.
APPLICATION FILED MAR. 12, 1909.
1,133,813.
Patented Mar. 30, 1915.
4 SHEETS—SHEET 4.
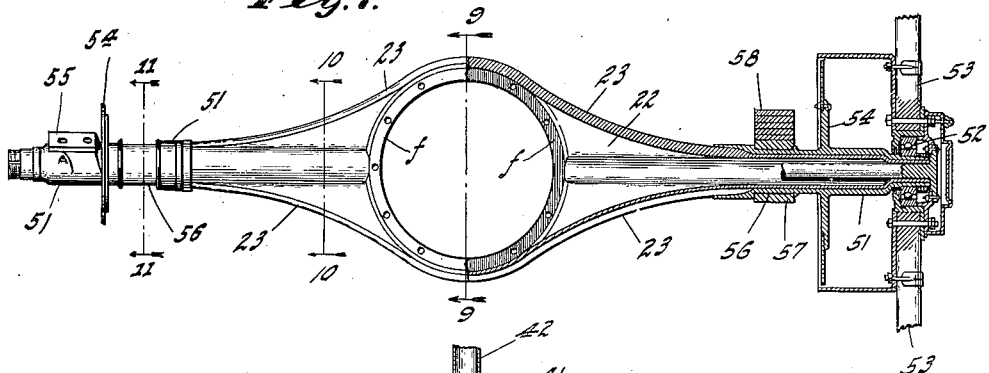
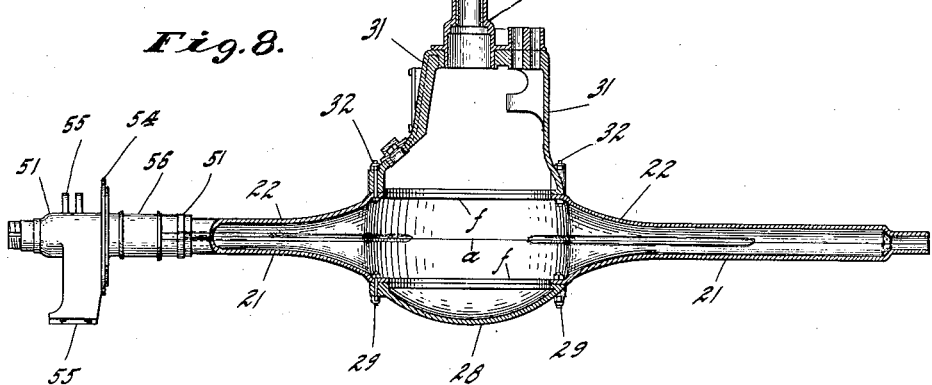
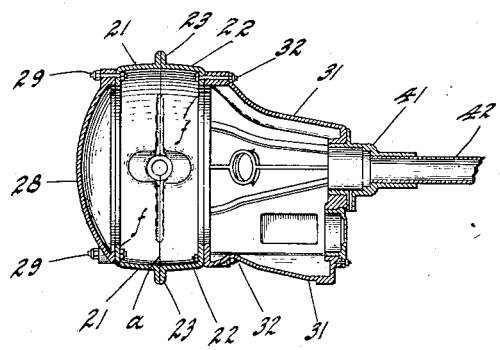
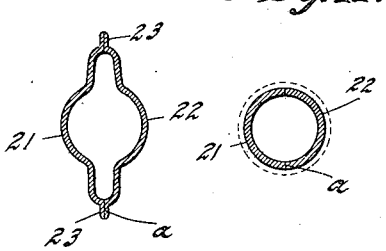
Witnesses
Frank A. Fahle
Thomas W. McMeans
Inventor
Howard C. Marmon,
By Bradford & Hood,
Attorneys

UNITED STATES PATENT OFFICE.

HOWARD C. MARMON, OF INDIANAPOLIS, INDIANA.

AXLE FOR MOTOR-VEHICLES.

1,133,813.  Specification of Letters Patent.  Patented Mar. 30, 1915.

Application filed March 12, 1909. Serial No. 482,929.

*To all whom it may concern:*

Be it known that I, HOWARD C. MARMON, a citizen of the United States, residing at Indianapolis, in the county of Marion and State of Indiana, have invented certain new and useful Improvements in Axles for Motor-Vehicles, of which the following is a specification.

The principal objects of my present invention are to simplify and reduce the cost of the shell or casing portion of motor-vehicle rear axles within which the driving mechanism is contained, and to so form and construct the same as to render the insertion and withdrawal of such mechanism more convenient.

Further objects consist in various details of construction and arrangements of parts, as will appear hereinafter.

A leading feature of the structure embodying my present invention consists in forming the main portion of the inclosing casing or shell of two (preferably counterpart) pressed steel members, united together to form the principal portion of the structure, as will be presently explained.

Another feature of this structure consists in securing to one side of the pressed steel structure thus formed a light shell or casting constituting a prolongation of the central chamber adapted to receive and contain the transmission mechanism.

Still another feature consists in providing shell castings, or reinforcing fittings, surrounding the ends of the pressed steel portion, embodying the wheel bearing supports, brake-mechanism supports, and spring-seat supports.

Figure 4:
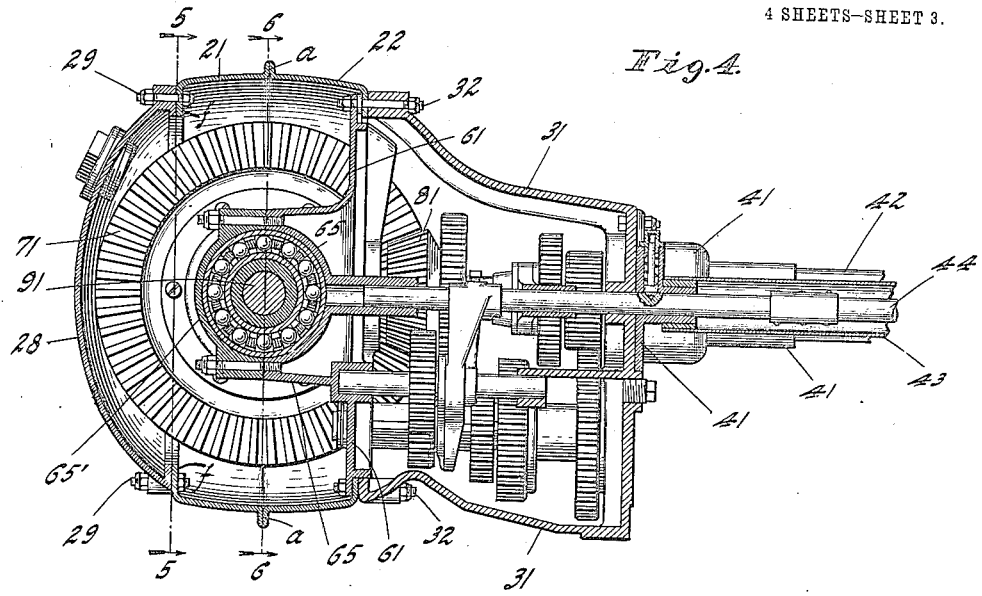
Figure 5:
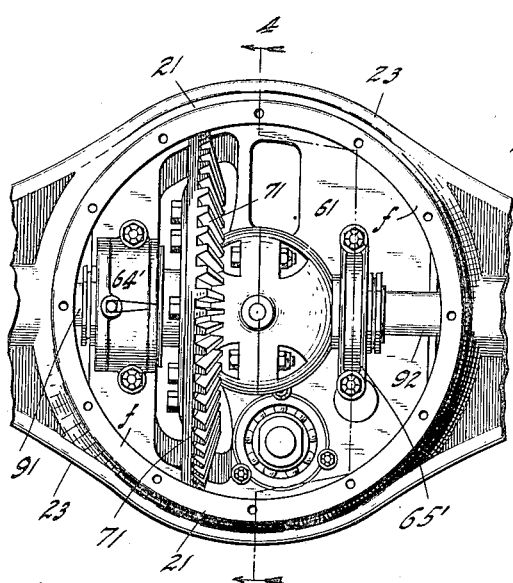
Figure 6:
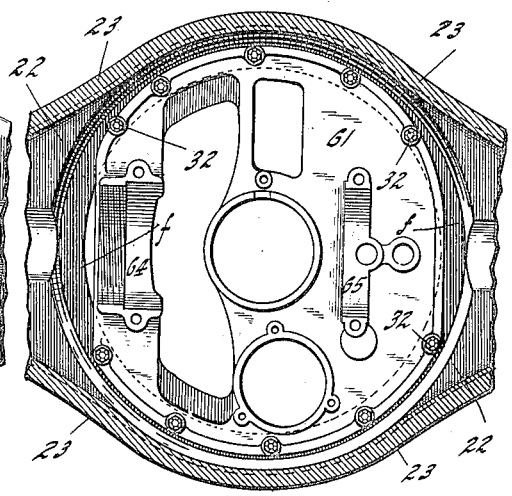

Referring to the accompanying drawings, which are made a part hereof, and on which similar reference characters indicate similar parts, Figure 1 is a top or plan view of so much of a motor vehicle chassis as includes the rear axle and adjacent parts; Fig. 2 a horizontal sectional view as seen when looking in the direction indicated by the arrows from the broken line 2 2 in Fig. 3 of the central portion of the axle structure on an enlarged scale, showing the arrangement of driving mechanism therein; Fig. 3 a vertical sectional view as seen when looking in the direction indicated by the arrows from the broken line 3 3 in Fig. 2; Fig. 4 a view similar to Fig. 3 but illustrating the construction as seen when looking in the direction indicated by the arrows from the broken line 4 4 in Fig. 5; Fig. 5 a rear elevation of the central portion of the hollow axle structure, with the covering cap removed; Fig. 6 a detail sectional view of the central portion of the rear axle structure as seen when looking in the direction indicated by the arrows from the broken lines 6 6 in Figs. 3 and 4, the mechanism however being omitted, and the supports therefor only shown; Fig. 7 a view partially in rear elevation and partially in longitudinal vertical section of the rear axle structure, otherwise separately, but showing the shell castings thereon and how the wheel is mounted thereon at one end; Fig. 8 a horizontal sectional view of the rear axle structure shell or casing, with the mechanism removed, on the same plane as that on which Fig. 2 is taken, but showing the shell casting thereon at one end; and Figs. 9, 10 and 11, transverse vertical sectional views as seen when looking in the direction indicated by the arrows from the broken lines 9 9, 10 10, and 11 11, respectively, in Fig. 7.

As heretofore briefly stated, the principal portion of my improved axle structure consists of two preferably counterpart pressed steel members 21 and 22, which are brought together and united into a unitary structure at the central longitudinal seam or rib *a*. This uniting of parts should be performed by welding, and I prefer oxy-acetylene welding as producing superior results. The general form of this pressed steel structure is best shown in Figs. 7 and 8. The central enlarged portion (at this stage of construction) is open upon both sides, while those portions which extend out from said central portions are substantially tubular and serve to contain the driving shafts or driving-axle members, which, when the mechanism is assembled, extend therethrough, and to the outer ends of which the driving wheels are connected. As best shown in Fig. 7, the form of the pressed steel members is such as to embody strengthening ribs extending from the central enlarged portion toward the ends. These ribs 23 are of such form and arrangement as to form a complete substitute for the usual truss rods by which the central portion of the axle structure is supported. Not only this, but the pressed steel being much stronger in proportion to its bulk than castings, the whole structure is very much reduced in weight, and consequently in cost, while its strength and rigidity are equal or superior to the heavy and bulky cast-and-trussed former construction. One of the large openings into the central chamber—that which is toward the rear of the car when the parts are assembled for use—is provided with a cap 28 adapted to be connected thereto by stud bolts 29. When this cap is removed, the opening is large enough through which to insert all of the driving or transmission mechanism; and when such mechanism has been inserted, the attachment of this cap 28 completely incloses the same, and protects it from dust and dirt.

It is a part of the object of my present invention to provide a chamber in the rear axle structure of sufficient capacity to contain the entire transmission gearing, and so arranged that all such gearing may be inserted through the opening which is covered by cap 28. In carrying out this object I provide a light shell-like structure 31 (preferably of aluminum) which is securely attached to the pressed steel shell forming the main part of the axle structure by means of bolts 32—said casting 31 being opposite to the cap 28, and registering with the opening at that point which corresponds to the opening which said cap 28 covers, so that the casting 31 forms a prolongation or continuation of the central chamber of the axle. Bolts 32 (as before stated) are shown as the means of connecting this casting and the adjacent portion of the pressed steel shell together; but this connection is designed to be permanent, and the bolts or other devices uniting these parts are not designed to be removable. In other words, when the members 21, 22 and 31 are once united, they are designed to be substantially and in effect an integral structure. Continuing on from the part 31 is a sleeve structure 41; and, to this the tubular members 42 and 43 are connected. The tubular member 42 extends forward to a point near the motor and contains the driving shaft by means of which the power is transmitted from the motor to the transmission or driving gearing, while the tubular member 43 contains the operating rods 44 and 45 for manipulating the transmission gear in shifting speeds. This arrangement is well illustrated in Figs. 1, 2 and 3.

Upon the outer ends of the tubular pressed steel axle structure I place fittings 51. These fittings 51 may be castings, forgings, or other suitably formed reinforcing members, and they serve several purposes. Upon the extreme ends are the cylindrical surfaces which receive the roller or other bearings 52 upon which the wheels 53 are mounted. At another point is a flange 54 which serves as a part of the inclosure of the brake drum, and there are also portions 55 to which certain parts of the brake mechanism are attached. At still another point a place 56 is provided for receiving the spring seats 57, upon which the vehicle springs 58 are mounted. Some of these surfaces, especially those to receive the bearings 52, must necessarily be machined. The sheet metal from which the pressed steel parts are formed is of course not sufficiently heavy to permit machining; and, at this extreme point, where it is reduced in size, needs some reinforcement otherwise. The addition, therefore, of this light shell casting at this point not only provides conveniently for the attachment of the several necessary parts, but adds to the rigidity and strength. In constructing my improved axle structure practically, I have found it preferable to place the pressed steel structures in molds, and cast these shell-like castings onto the ends thereof directly. This not only insures a perfect fit, but the shrinkage of the molten metal in cooling secures the castings in place with a rigidity and firmness otherwise not easily attainable.

In assembling the mechanism which is designed to be contained within the chambers of my improved axle structure, the transmission gearing is first inserted through the opening which is afterward covered by the cap 28, and secured in place in appropriate bearings within that portion of the chamber formed by the shell-like casting 31. A bevel pinion which engages with the bevel gear wheel of the differential gearing is attached directly to this transmission gearing. When the transmission gearing has been put in place, it is followed by a suitable plate 61, which provides a supporting bearing therefor, and also provides supporting bearings for the differential. The plate 61 is held in place by some of the bolts 32, some of which, especially those at the top, may have intermediate heads with threaded portions on both sides thereof, as shown in the upper portions of Figs. 3 and 4. This allows the removal or insertion of the plate 61 without disturbing the relation of the parts 21 and 22 and the shell 31. The differential gearing is then inserted and secured in its bearings, the edge of the main bevel gear thereof passing through a suitable opening in plate 61 and engaging with the driving pinion. The caps of the bearings for the differential are then secured in place, after which the cap 28 is placed in position and there secured. The axle shafts are inserted from the outer ends of the axles within the tubular portions of the axle structure which extend out from the center to the ends, and have squared or non-circular ends which engage with correspondingly-formed sockets in members of the differential or compensating gear. These axle shafts carry the driving wheels at their outer ends as is clearly shown.

The plate 61, as best shown in Figs. 3 and 6, is of somewhat greater diameter for the most part than the opening through which it is introduced. I therefore, as shown in Fig. 6, reduce the plate somewhat on two of its edges, so that it may pass in through the opening which is afterward covered by the cap 28. The openings in the pressed steel structure need to be as large as is practicable, but each of them must necessarily be surrounded by an inturned flange (as f) or edge for purposes of stiffness and strength. Both these openings are therefore made of the same size. One of them is permanently covered or closed by the casing 31, while the other is opened or closed at pleasure by the removable cap 28. An opening of considerable size is also formed through the plate 61 to permit the bevel gear wheel 71 of the differential or compensating gearing to pass through and engage with the pinion 81 of the transmission gearing. The plate 61 contains bearings 62 and 63 for the shafts of the transmission gear, and it is provided upon its surface with the bearings 64 and 65 for the differential gear—the latter being provided with caps 64' and 65'.

The rear axle shaft sections 91 and 92 have squared or non-circular ends which enter and engage with the appropriate members of the differential gear, and the driving shaft 93 leading from the motor through tubular inclosure 42 has a squared or non-circular end which suitably engages with the appropriate member of the transmission gear. Within the bearings 64 is an adjustable member 72, suitable manipulation of which enables a proper adjustment of bevel gear wheel 71 to cause it to mesh in the proper manner with pinion 81.

Having thus fully described my said invention, what I claim as new, and desire to secure by Letters Patent, is:—

1. In a motor vehicle, the combination with the rear axle, wheels, and driving mechanism therefor, of an inclosing casing within which said rear axle mechanism is contained and having a lateral opening, a removable plate secured within the chamber adjacent to the opening leading from the central portion into the shell, said central plate being provided with bearings transverse to the plane thereof for the shafts of the transmission gear, and with bearings parallel with the plane thereof for the differential gear.

2. In a motor vehicle, the combination with the rear axle, wheels, and driving mechanism therefor, of an inclosing casing within which said rear axle mechanism is contained composed of two pressed steel portions, each integral from one end of the casing to the other, the two portions meeting along a central substantially vertical longitudinal plane and there being united, said inclosing casing having an enlarged central portion with tubular portions extending out laterally therefrom, and tubular reinforcements surrounding the outer ends of said tubular portions for receiving the wheels and the superstructure.

3. The combination, in a motor vehicle, of the inclosing casing for the rear axle mechanism, and reinforcements secured to the outer ends of said inclosing casing comprising wheel-bearing supports, brake-mechanism supports, and spring-seat supports.

4. The combination, in a motor vehicle, of an inclosing casing for the rear axle mechanism having an enlarged central portion which central portion has oppositely-disposed openings, a shell secured over one of said openings and forming a continuation of the mechanism chamber, and a plate adapted to be secured within said chamber, said plate being somewhat larger in its greater diameter than the opening in the side of said chamber and thus adapted to be secured to a rim bounding the opposite opening but having its sides reduced to enable it to be introduced through the opening.

5. The combination, in a motor vehicle, of a rear axle structure comprising a shell-like member having an enlarged central portion, reinforcing members secured to the ends of said shell-like member and embodying wheel-bearing supports, brake-mechanism supports and spring-seat supports, rear axle shafts within the hollow rear axle structure and extending out through the ends thereof, wheels secured to the ends of said rear axle shafts, bearings carried by the wheel-bearing supports on said reinforcing members, brake-drums and brake-mechanisms carried by the brake-mechanism supports, and spring seats carried by the spring-seat supports.

6. The combination, in a motor vehicle, of a hollow rear axle structure having a central chamber adapted to contain the speed-varying transmission and differential gearing and provided with an opening at the rear side of said structure sufficiently large to enable such gearing to be introduced therethrough, said transmission and differential gearing bearings removably mounted within said chamber to receive and support said gearing, non-circular engaging parts in members of said gearing to engage with the driving shaft and the axle shaft sections respectively, said several shaft sections having non-circular engaging ends and adapted to be introduced to within the hollow structure from points divergent from that where the mechanism is introduced into the chamber.

7. The combination, in a motor vehicle, of a hollow rear axle structure having a central chamber adapted to contain the speed-varying transmission and differential gearing and an opening at the rear side of said structure sufficiently large to enable such gearing to be introduced therethrough, said transmission and differential gearing bearings removably mounted within said chamber to receive and support said gearing, shafts leading from the differential gearing to the wheels, a shaft leading from the transmission gearing toward the motor, and separable connections between said shafts and said gearing at the points at which they are respectively engaged.

8. The combination, in a motor vehicle, of a hollow rear axle structure having a central chamber adapted to contain the speed-varying transmission and differential gearing and an opening at the rear side of said structure sufficiently large to enable such gearing to be introduced therethrough, said transmission and differential gearing bearings removably mounted within said chamber to receive and support said gearing, shafts leading from the differential gearing to the wheels, a shaft leading from the transmission gearing toward the motor, and separable connections between said shafts and said gearing at the point at which they are respectively engaged, the opening through which the gearing is introduced into the chamber being provided with a removable cap whereby convenient access may be had thereto.

9. The combination, in a motor vehicle, of a hollow rear axle structure, driving shaft sections contained therein and extending to the outer ends of said structure, bearings for the wheels exterior to said hollow axle structure, said wheels, and rigid connections between said driving shaft sections and said wheels.

10. The combination, in a motor vehicle, of a hollow rear axle structure, driving shaft sections contained therein and extending to the outer ends of said structure, bearings for the wheels exterior to said hollow axle structure in the load plane of the wheels, said wheels, and rigid connections between said driving shaft sections and said wheels.

11. In an automobile, the combination of a tubular axle casing formed of two pressed sheet metal sections each extending from one end of the casing to the other, the two sections being secured together on a substantially vertical axial plane to form an intermediate enlarged gear housing and oppositely extending tubular arms with radially extending ribs at the meeting plane in the crotches between the enlarged central portion and the oppositely extending tubular arms, a compensator gearing mounted within said enlarged portion of the casing, reinforcing members sleeved upon the outer ends of the tubular arms, traction wheel bearings carried by said reinforcing members, traction wheels journaled upon said bearings, torque rods arranged within the tubular arms of the casing and rotatively connecting the traction wheels and compensating gearing, and bracket supports and spring seats carried by said reinforcing members.

12. In an automobile, the combination of a tubular axle casing formed of two pressed sheet metal sections each extending from one end of the casing to the other, the two sections being secured together on a substantially vertical axial plane to form an intermediate enlarged gear housing and oppositely extending tubular arms with radially extending ribs at the meeting plane in the crotches between the enlarged central portion and the oppositely extending tubular arms, a compensator gearing mounted within said enlarged portion of the casing, reinforcing members sleeved upon the outer ends of the tubular arms, traction wheel bearings carried by said reinforcing members, traction wheels journaled upon said bearings, and torque rods arranged within the tubular arms of the casing and rotatively connecting the traction wheels and compensating gearing.

13. In an automobile, the combination of a tubular axle casing formed of two pressed sheet metal sections each extending from one end of the casing to the other, the two sections being secured together on a substantially vertical axial plane to form an intermediate enlarged gear housing and oppositely extending tubular arms, a compensator gearing mounted within said enlarged portion of the casing, reinforcing members sleeved upon the outer ends of the tubular arms, traction wheel bearings carried by said reinforcing members, traction wheels journaled upon said bearings, torque rods arranged within the tubular arms of the casing and rotatively connecting the traction wheels and compensating gearing, and bracket supports and spring seats carried by said reinforcing members.

14. In an automobile, the combination of a tubular axle casing formed of two pressed sheet metal sections each extending from one end of the casing to the other, the two sections being secured together on a substantially vertical axial plane to form an intermediate enlarged gear housing and oppositely extending tubular arms, a compensator gearing mounted within said enlarged portion of the casing, reinforcing members sleeved upon the outer ends of the tubular arms, traction wheel bearings carried by said reinforcing members, traction wheels journaled upon said bearings, and torque rods arranged within the tubular arms of the casing and rotatively connecting the traction wheels and compensating gearing.

15. The combination, in a motor vehicle, of an inclosing casing for the rear axle mechanism, said casing comprising two duplicate parts meeting in a vertical axial plane and there united and each extending the full length of the casing, and reinforcing members mounted on the ends of said casing and furnishing wheel supports, said reinforcing members being mounted on said casing by a shrinking fit.

16. The combination, in a motor vehicle, of an inclosing casing for the rear axle mechanism having an enlarged central portion with oppositely disposed openings, a shell secured over one of said openings and forming a continuation of the mechanism chamber, a plate removably secured within said chamber independently of said shell, said plate being of such size that it may be inserted through the other opening than the one over which the shell is secured and being provided with bearings for the mechanism.

In witness whereof, I have hereunto set my hand and seal at Indianapolis, Indiana, this ninth day of March, A. D. one thousand nine hundred and nine.

HOWARD C. MARMON. [L. S.]

Witnesses:
CHESTER BRADFORD,
ARTHUR M. HOOD.